United States Patent
Philyaw et al.

(10) Patent No.: US 6,970,914 B1
(45) Date of Patent: *Nov. 29, 2005

(54) METHOD AND APPARATUS FOR EMBEDDING ROUTING INFORMATION TO A REMOTE WEB SITE IN AN AUDIO/VIDEO TRACK

(75) Inventors: Jeffry Jovan Philyaw, Dallas, TX (US); David Kent Mathews, Carrollton, TX (US)

(73) Assignee: L. V. Partners, L.P., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,222

(22) Filed: Aug. 19, 1999

Related U.S. Application Data

(63) Continuation-in-part of application No. 09/151,530, filed on Sep. 11, 1998, now Pat. No. 6,098,106.

(51) Int. Cl.$^7$ .............................................. G06F 15/16
(52) U.S. Cl. ...................................... 709/217; 709/238
(58) Field of Search ................................ 709/218, 219, 709/203, 201, 238, 217, 227

(56) References Cited

U.S. PATENT DOCUMENTS

| | | | |
|---|---|---|---|
| 3,668,312 A | 6/1972 | Yamamoto et al. | 178/6.8 |
| 4,002,886 A | 1/1977 | Sundelin | 235/61.7 R |
| 4,042,792 A | 8/1977 | Pakenham et al. | 179/90 |
| 4,365,148 A | 12/1982 | Whitney | 235/383 |
| 4,621,259 A | 11/1986 | Schepers et al. | 340/707 |
| 4,654,482 A | 3/1987 | DeAngelis | 379/95 |
| 4,780,599 A | 10/1988 | Baus | 235/383 |
| 4,785,296 A | 11/1988 | Tabata et al. | 340/731 |
| 4,816,904 A | 3/1989 | McKenna et al. | 358/84 |
| 4,817,136 A | 3/1989 | Rhoads | 379/357 |
| 4,833,308 A | 5/1989 | Humble | 235/383 |
| 4,841,132 A | 6/1989 | Kajitani et al. | 235/472 |
| 4,845,634 A | 7/1989 | Vitek et al. | 364/468 |
| 4,894,789 A | 1/1990 | Yee | 364/521 |

(Continued)

FOREIGN PATENT DOCUMENTS

EP 0 961 250 A2 12/1999 ........... G07F 19/00

(Continued)

OTHER PUBLICATIONS

"Group Decision Support System: Development and Application", Energy Systems, Westinghouse, Pittsburgh, PA.

(Continued)

Primary Examiner—Marc D. Thompson
(74) Attorney, Agent, or Firm—Howison & Arnott, L.L.P.

(57) ABSTRACT

A redirect system is provided which is operable to redirect information over a network 1610. This information is associated with a compressed MP3 audio file which is initially transmitted through the network from a source 1612 to a user PC 1600. The user PC 1600 will then play the information and, upon playing the information, embedded information within the audio file will be detected by an application program 1604. This will cause a browser 1602 to launch and route the embedded information to an intermediate node 1620. This information will be matched with information in a database 1624, which information provides routing information to a producer location 1614. This is transmitted back to the user PC 1600 which will then effect a connection with the producer 1614 to either view in the simple case a web page and, in the more complex case, actually transmit information from the database 1624 through the user PC 1600 to the producer 1614 to provide a customized communication in the form of a customized web page.

10 Claims, 8 Drawing Sheets

U.S. PATENT DOCUMENTS

| | | | | |
|---|---|---|---|---|
| 4,899,370 | A | 2/1990 | Kameo et al. | 379/104 |
| 4,901,073 | A | 2/1990 | Kibrick | 341/13 |
| 4,905,094 | A | 2/1990 | Pocock et al. | 358/342 |
| 4,907,264 | A | 3/1990 | Seiler et al. | 379/355 |
| 4,916,293 | A | 4/1990 | Cartlidge et al. | 235/375 |
| 4,937,853 | A | 6/1990 | Brule et al. | 379/96 |
| 4,947,028 | A | 8/1990 | Gorog | 235/381 |
| 4,959,530 | A | 9/1990 | O'Connor | 235/383 |
| 4,975,948 | A | 12/1990 | Andresen et al. | 379/355 |
| 4,984,155 | A | 1/1991 | Geier et al. | 364/401 |
| 5,038,023 | A | 8/1991 | Saliga | 235/385 |
| 5,054,096 | A | 10/1991 | Beizer | 382/41 |
| 5,088,045 | A | 2/1992 | Shimanaka et al. | 364/468 |
| 5,111,391 | A | 5/1992 | Fields et al. | 364/401 |
| 5,115,326 | A | 5/1992 | Burgess et al. | 358/440 |
| 5,128,752 | A | 7/1992 | Von Kohorn | 358/84 |
| 5,144,654 | A | 9/1992 | Kelley et al. | 379/356 |
| 5,161,037 | A | 11/1992 | Saito | 358/468 |
| 5,161,214 | A | 11/1992 | Addink et al. | 395/145 |
| 5,182,705 | A | 1/1993 | Barr et al. | 364/401 |
| 5,189,630 | A | 2/1993 | Barstow et al. | 364/514 |
| 5,191,525 | A | 3/1993 | LeBrun et al. | 364/419 |
| 5,198,644 | A | 3/1993 | Pfeiffer et al. | 235/383 |
| 5,213,337 | A * | 5/1993 | Sherman | 725/136 |
| 5,235,654 | A | 8/1993 | Anderson et al. | 382/61 |
| 5,241,402 | A | 8/1993 | Aboujaoude et al. | 358/406 |
| 5,243,531 | A | 9/1993 | DiPippo et al. | 364/468 |
| 5,247,347 | A | 9/1993 | Litteral et al. | 358/85 |
| 5,262,860 | A | 11/1993 | Fitzpatrick et al. | 358/142 |
| 5,285,278 | A | 2/1994 | Holman | 358/142 |
| 5,287,181 | A | 2/1994 | Holman | 348/473 |
| 5,288,976 | A | 2/1994 | Citron et al. | 235/375 |
| 5,296,688 | A | 3/1994 | Hamilton et al. | 235/375 |
| 5,304,786 | A | 4/1994 | Pavlidis et al. | 235/462 |
| 5,305,195 | A | 4/1994 | Murphy | 364/401 |
| 5,319,454 | A | 6/1994 | Schutte | 348/5.5 |
| 5,324,922 | A | 6/1994 | Roberts | 235/375 |
| 5,331,547 | A | 7/1994 | Laszlo | 364/413.01 |
| 5,340,966 | A | 8/1994 | Morimoto | 235/376 |
| 5,357,276 | A | 10/1994 | Banker et al. | 348/7 |
| 5,362,948 | A | 11/1994 | Morimoto | 235/376 |
| 5,382,779 | A | 1/1995 | Gupta | 235/383 |
| 5,386,298 | A | 1/1995 | Bronnenberg et al. | 358/403 |
| 5,398,336 | A | 3/1995 | Tantry et al. | 395/600 |
| 5,405,232 | A | 4/1995 | Lloyd et al. | 414/280 |
| 5,418,713 | A | 5/1995 | Allen | 364/403 |
| 5,420,403 | A | 5/1995 | Allum et al. | 235/375 |
| 5,420,943 | A | 5/1995 | Mak | 382/313 |
| 5,424,524 | A | 6/1995 | Ruppert et al. | 235/462 |
| 5,438,355 | A | 8/1995 | Palmer | 348/1 |
| 5,446,490 | A | 8/1995 | Blahut et al. | 348/7 |
| 5,446,919 | A | 8/1995 | Wilkins | 455/6.2 |
| 5,491,508 | A | 2/1996 | Friedell et al. | 348/16 |
| 5,493,107 | A | 2/1996 | Gupta et al. | 235/383 |
| 5,519,878 | A | 5/1996 | Dolin, Jr. | 395/800 |
| 5,530,852 | A | 6/1996 | Meske, Jr. et al. | 396/600 |
| 5,570,295 | A | 10/1996 | Isenberg et al. | 364/514 |
| 5,572,643 | A | 11/1996 | Judson | 395/793 |
| 5,592,551 | A | 1/1997 | Lett et al. | 380/20 |
| 5,594,226 | A | 1/1997 | Steger | 235/379 |
| 5,602,377 | A | 2/1997 | Beller et al. | 235/462 |
| 5,604,542 | A | 2/1997 | Dedrick | |
| 5,640,193 | A | 6/1997 | Wellner | 348/7 |
| 5,649,186 | A | 7/1997 | Ferguson | 395/610 |
| 5,664,110 | A | 9/1997 | Green et al. | 705/26 |
| 5,671,282 | A | 9/1997 | Wolff et al. | 380/25 |
| 5,675,721 | A | 10/1997 | Freedman et al. | 395/129 |
| 5,682,540 | A | 10/1997 | Klotz, Jr. et al. | 395/766 |
| 5,694,163 | A | 12/1997 | Harrison | 348/13 |
| 5,708,780 | A | 1/1998 | Levergood et al. | 395/200.12 |
| 5,710,887 | A | 1/1998 | Chelliah et al. | 395/226 |
| 5,715,314 | A | 2/1998 | Payne et al. | 380/24 |
| 5,724,424 | A | 3/1998 | Gifford | 380/24 |
| 5,745,681 | A | 4/1998 | Levine et al. | 395/200.3 |
| 5,754,906 | A | 5/1998 | Yoshida | 396/448 |
| 5,757,917 | A | 5/1998 | Rose et al. | 380/25 |
| 5,761,606 | A | 6/1998 | Wolzien | 455/6.2 |
| 5,764,906 | A | 6/1998 | Edelstein et al. | 395/200.49 |
| 5,765,176 | A | 6/1998 | Bloomberg | 707/514 |
| 5,768,528 | A | 6/1998 | Stumm | 395/200.61 |
| 5,774,664 | A | 6/1998 | Hidary et al. | 395/200 |
| 5,774,666 | A * | 6/1998 | Portuesi | 709/219 |
| 5,774,870 | A | 6/1998 | Storey | 705/14 |
| 5,778,367 | A | 7/1998 | Wesinger, Jr. et al. | 707/10 |
| 5,790,793 | A | 8/1998 | Higley | 395/200.48 |
| 5,791,991 | A | 8/1998 | Small | 463/41 |
| 5,794,210 | A | 8/1998 | Goldhaber et al. | 705/14 |
| 5,796,952 | A | 8/1998 | Davis et al. | 305/200.54 |
| 5,804,803 | A | 9/1998 | Cragun et al. | 235/375 |
| 5,815,776 | A | 9/1998 | Nukada | 399/174 |
| 5,832,223 | A | 11/1998 | Hara et al. | 395/200.47 |
| 5,833,468 | A | 11/1998 | Guy et al. | 434/350 |
| 5,848,202 | A | 12/1998 | D'Eri et al. | 382/306 |
| 5,848,413 | A | 12/1998 | Wolff | 707/10 |
| 5,854,897 | A | 12/1998 | Radziewicz et al. | 709/224 |
| 5,864,823 | A | 1/1999 | Levitan | 105/14 |
| 5,869,819 | A | 2/1999 | Knowles et al. | 235/375 |
| 5,905,248 | A | 5/1999 | Russell et al. | 235/462 |
| 5,905,251 | A | 5/1999 | Knowles | 235/472.01 |
| 5,905,665 | A | 5/1999 | Rim | 364/746 |
| 5,905,865 | A * | 5/1999 | Palmer et al. | 709/217 |
| 5,907,793 | A | 5/1999 | Reams | 455/3.1 |
| 5,915,090 | A | 6/1999 | Joseph et al. | 709/202 |
| 5,918,214 | A | 6/1999 | Perkowski | 705/27 |
| 5,925,865 | A | 7/1999 | Steger | 235/379 |
| 5,929,850 | A | 7/1999 | Broadwin et al. | 345/327 |
| 5,932,863 | A | 8/1999 | Rathus et al. | 235/462.15 |
| 5,933,829 | A | 8/1999 | Durst et al. | 707/10 |
| 5,945,932 | A * | 8/1999 | Smith et al. | 341/51 |
| 5,948,061 | A | 9/1999 | Merriman et al. | 709/219 |
| 5,957,695 | A | 9/1999 | Redford et al. | 434/307 R |
| 5,960,411 | A | 9/1999 | Hartman et al. | 705/26 |
| 5,961,603 | A | 10/1999 | Kunkel et al. | 709/229 |
| 5,970,471 | A | 10/1999 | Hill | 705/26 |
| 5,970,472 | A | 10/1999 | Allsop et al. | 705/26 |
| 5,971,277 | A | 10/1999 | Cragun et al. | 235/462.01 |
| 5,974,443 | A | 10/1999 | Jeske | 709/202 |
| 5,974,451 | A | 10/1999 | Simmons | 709/218 |
| 5,976,833 | A | 11/1999 | Furukawa et al. | 435/69.1 |
| 5,978,773 | A * | 11/1999 | Hudetz et al. | 709/219 |
| 5,991,739 | A | 11/1999 | Cupps et al. | 705/26 |
| 5,992,752 | A | 11/1999 | Wilz, Sr. et al. | 235/472.01 |
| 5,995,105 | A | 11/1999 | Reber et al. | 345/356 |
| 6,002,394 | A | 12/1999 | Schein et al. | 345/327 |
| 6,003,073 | A | 12/1999 | Solvason | 709/219 |
| 6,006,257 | A | 12/1999 | Slezak | 709/219 |
| 6,009,410 | A | 12/1999 | LeMole et al. | 709/219 |
| 6,009,465 | A | 12/1999 | Decker et al. | 709/219 |
| 6,012,102 | A | 1/2000 | Shachar | 710/5 |
| 6,018,764 | A | 1/2000 | Field et al. | 709/217 |
| 6,018,768 | A * | 1/2000 | Ullman et al. | 709/218 |
| 6,049,539 | A | 4/2000 | Lee et al. | 370/355 |
| 6,061,719 | A * | 5/2000 | Bendinelli et al. | 709/218 |
| 6,064,979 | A | 5/2000 | Perkowski | 705/26 |
| 6,097,375 | A * | 8/2000 | Byford | 345/169 |
| 6,098,106 | A * | 8/2000 | Philyaw et al. | 709/238 |
| 6,108,656 | A | 8/2000 | Durst et al. | 707/10 |
| 6,122,403 | A * | 9/2000 | Rhoads | 382/233 |
| 6,161,132 | A * | 12/2000 | Roberts et al. | 709/219 |
| 6,163,803 | A * | 12/2000 | Watanabe | 709/217 |
| 6,195,693 | B1 * | 2/2001 | Berry et al. | 709/219 |

FOREIGN PATENT DOCUMENTS

| WO | WO 95/10813 | 10/1994 | G06F 15/403 |
|---|---|---|---|
| WO | WO 96/07146 | 9/1995 | G06F 17/00 |
| WO | WO 97/37319 | 2/1997 | G06K 7/10 |
| WO | WO 98/09243 | 8/1997 | G06F 19/00 |
| WO | WO 98/03923 | 1/1998 | G06F 15/163 |
| WO | WO 98/06055 | 2/1998 | G06F 163/00 |
| WO | WO 98/19259 | 5/1998 | G06F 17/60 |
| WO | WO 98/40823 | 9/1998 | G06F 13/00 |
| WO | WO 99/63457 | 6/1999 | G06F 17/30 |

OTHER PUBLICATIONS

"New Technologies in Credit Card Authentication", Pieter de Bryne, Institute for Communications Technology, Zurich, Switzerland.

"A VITAL, a Private Teaching System by Fax Communication", Atsusji Iizawa, Noriro Sugiki, Yukari Shitora and Hideko Kunii, Software Research Center, Tokyo, Japan.

"Document on Computer" USPS Technical Support Center, Norman, OK.

"Development of a Commercially Successful Wearable Data Collection System", Symbol Technologies, Inc.

What do forward looking companies consider in their plans and developments?, A.G. Johnston, Nestle.

"The Automation Synergy", Neves and Noivo, Portugal.

"Integration of Hand-Written Address Interpretation Technology into the United States Postal Service Remote Computer Reader System", Srihari (Cedar, Suny at Buffalo) and Kueberg (U.S. Postal Service, VA).

"Paper Based Document Security—A Review", van Renesse, TNO Institute of Applied Physics, The Netherlands.

"IEEE Standard for Bar Coding for Distribution Transformers" Transforners Committee of the IEEE Power Engineering Society, The Institute of Electrical and Electronics Engineers, Inc. NY.

"The Stylus™-Shopping from Home", STYLUS Innovation, MA.

"Distributing Uniform Resource Locators as Bar Code Images", IBM Technical Disclosure Bulleting, Jan. 1996.

"Bar Code Method for Automating Catalog Orders", IBM Technical Disclosure Bulletin, Sep. 1998.

"Bar-Code Recognition System Using Image Processing", Kuroki, Yoneoka et al., Hitachi Research Laborator.

* cited by examiner

PATH A: SOURCE TO ARS

| 400 | URL OF ARS | ADVERTISER PRODUCT CODE | URL OF SOURCE |

*FIG. 4a*

PATH B: ARS TO SOURCE

| 402 | URL OF SOURCE | URL OF ADVERTISER | URL OF ARS |

*FIG. 4b*

PATH C: SOURCE TO ADVERTISER

| 404 | URL OF ADVERTISER | REQUEST-FOR-INFORMATION | URL OF SOURCE |

*FIG. 4c*

PATH D: ADVERTISER TO SOURCE

| 406 | URL OF SOURCE | REQUESTED INFORMATION | URL OF ADVERTISER |

*FIG. 4d*

PATH E: ARS TO ADVERTISER (OPTIONAL)

| 408 | URL OF ADVERTISER | REQUEST-FOR-INFORMATION | URL OF SOURCE |

*FIG. 4e*

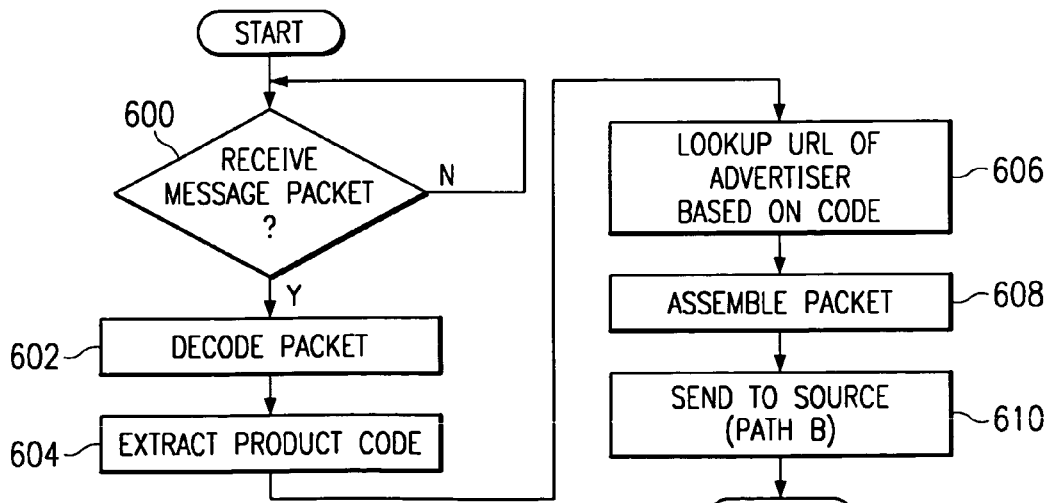

*FIG. 6*

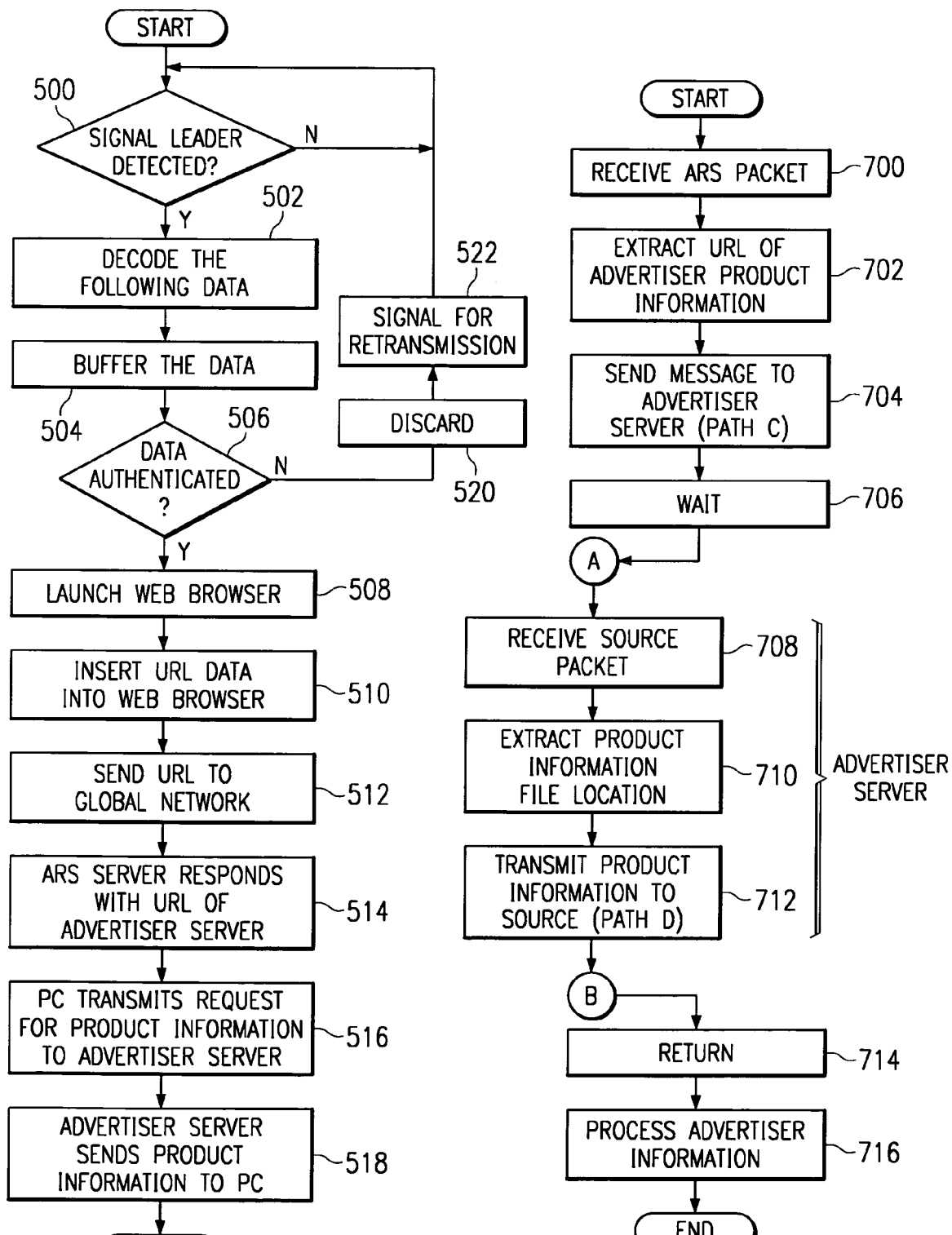

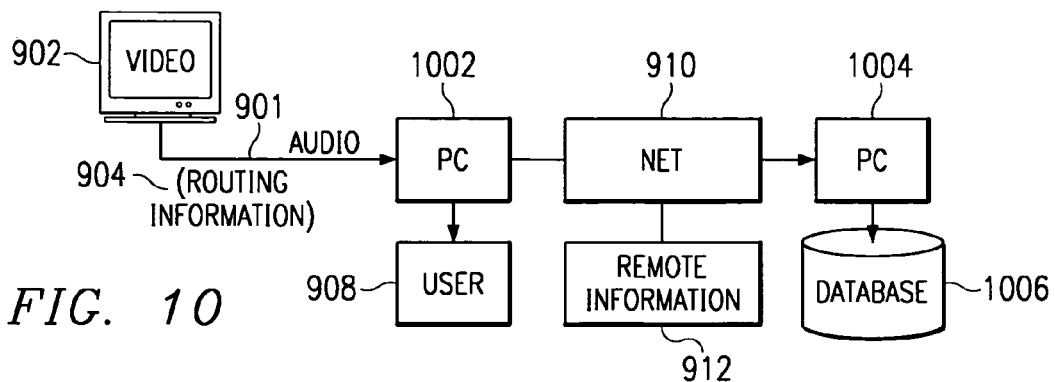
FIG. 10
FIG. 11
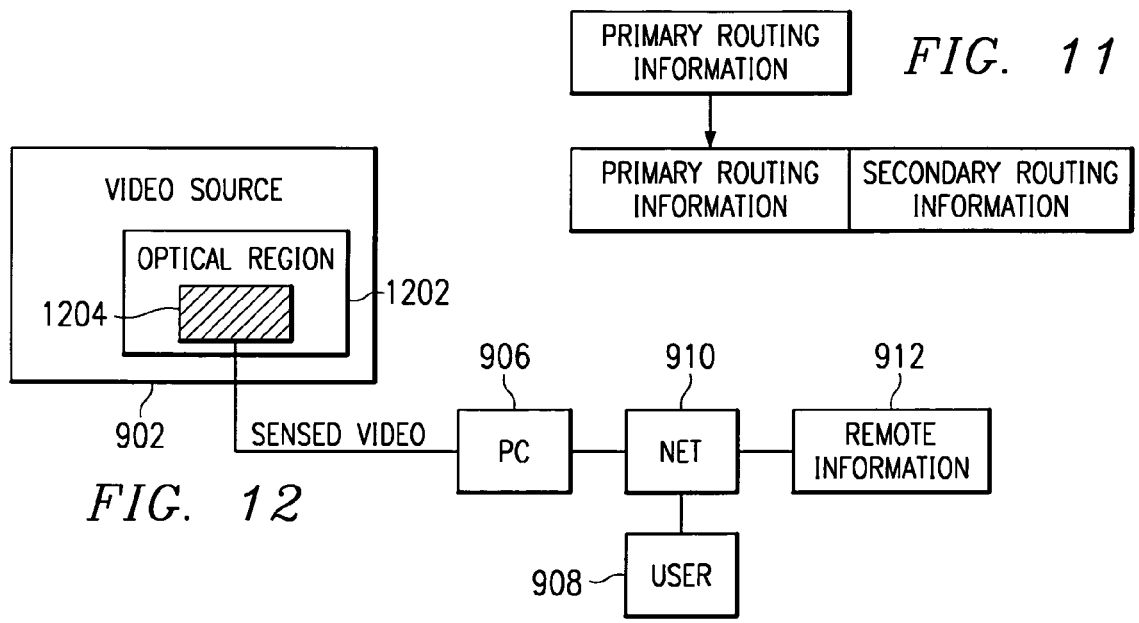
FIG. 12
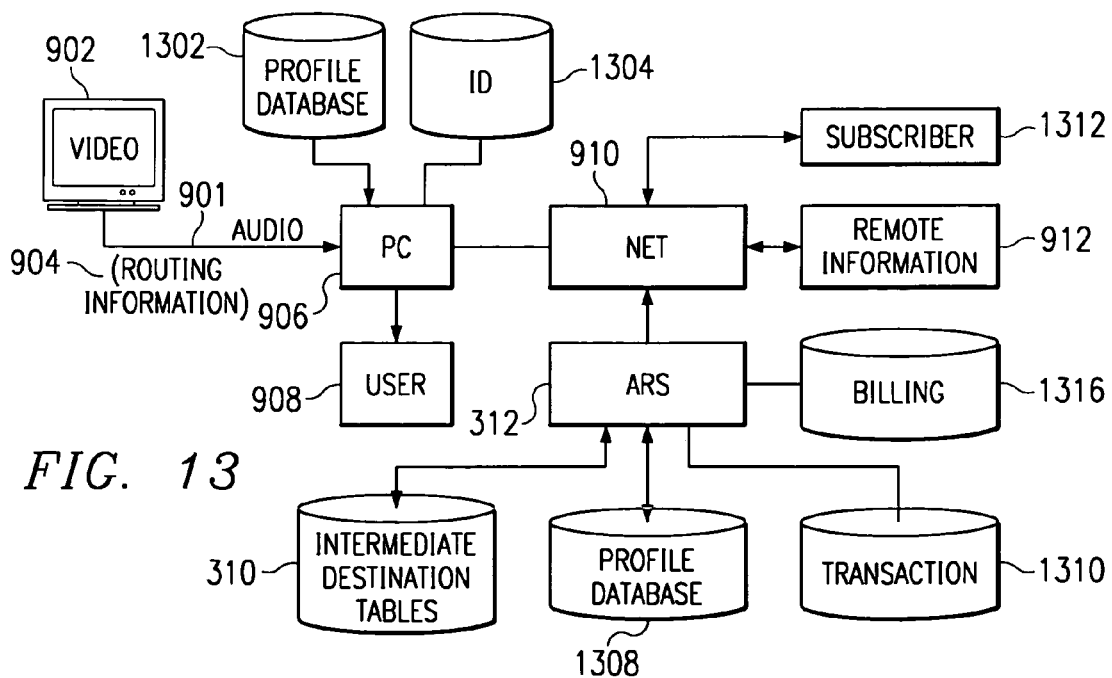
FIG. 13

METHOD AND APPARATUS FOR EMBEDDING ROUTING INFORMATION TO A REMOTE WEB SITE IN AN AUDIO/VIDEO TRACK

CROSS REFERENCE TO RELATED APPLICATION

This application is a Continuation-In-Part of U.S. patent application Ser. No. 09/151,530 entitled "METHOD FOR CONTROLLING A COMPUTER WITH AN AUDIO SIGNAL" filed on Sep. 11, 1998, and issued on Aug. 1, 2000 as U.S. Pat. No. 6,098,106, and is related to U.S. patent application Ser. No. 09/151,471 entitled "METHOD FOR INTERFACING SCANNED PRODUCT INFORMATION WITH A SOURCE FOR THE PRODUCT OVER A GLOBAL NETWORK" filed on Sep. 11, 1998; and is related to U.S. patent application Ser. No. 09/378,220 entitled, "METHOD AND APPARATUS FOR CONTROLLING A COMPUTER FROM A REMOTE LOCATION" filed on Aug. 19, 1999.

TECHNICAL FIELD OF THE INVENTION

This invention is related to a method of computer control, and particularly for automatically directing a web browser application on the computer to retrieve and display information in response to an analog signal.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . . " down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line commerce necessitates a large database.

SUMMARY OF THE INVENTION

The present invention disclosed and claimed herein comprises a method and apparatus for effecting a connection between a user's node on a network and a destination node on a network with an audio program. The audio program is played at the user's node wherein the audio program has embedded therein a unique code. The unique code is detected at the user's node during the playing of the audio program and, in response to the detection thereof, information regarding the unique code is transmitted over the network to an intermediate node on the network. At the intermediate node, this received unique code is compared with a database of unique codes having associated routing information therewith. The routing information defines the location on the network of a plurality of destination nodes. Since there is a correlation between each unique code stored in the database and one or more of the destination nodes, a match between the received unique code and a unique code in the database defines corresponding routing information. This routing information is then utilized to cause the destination node and the user node to be connected over the network such that the destination node can then transmit information to the user node.

In other aspects of the present invention, the user node is connected to the destination node by first transmitting back to the user node the routing information determined to be stored in the database and corresponding to the received unique code. The user node then utilizes this received routing information to effect a connection to the destination node from the user node. The destination node, in response to being connected to the user node via the routing information, is then operable to transfer information to the user's node.

In a yet further aspect of the present invention, the user's node includes the user ID information that uniquely identifies the user node. The database at the intermediate node further includes a stored profile which is associated therein with the user ID information with the user ID information of the user node. When information is transmitted to the intermediate node regarding the unique code over the network, the user ID information is also transmitted therewith to the intermediate node. During the matching operation, user profile information associated with the user ID information is then extracted and transmitted back to the user's node as an appendage to the routing information transmitted thereto. This user ID information will then be relayed to the destination node, the destination node then utilizing this user ID information in a predetermined manner.

BRIEF DESCRIPTION OF THE DRAWINGS

For a more complete understanding of the present invention and the advantages thereof, reference is now made to the following description taken in conjunction with the accompanying Drawings in which:

FIGS. 4a–4e illustrate the various message packets transmitted between the source PC and network servers used in the preferred embodiment;

FIG. 5 is a flowchart depicting operation of the system according to the preferred embodiment;

FIG. 6 illustrates a flowchart of actions taken by the Advertiser Reference Server ("ARS") server;

FIG. 7 illustrates a flowchart of the interactive process between the source computer and ARS;

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

DETAILED DESCRIPTION OF THE INVENTION

Figure 1:
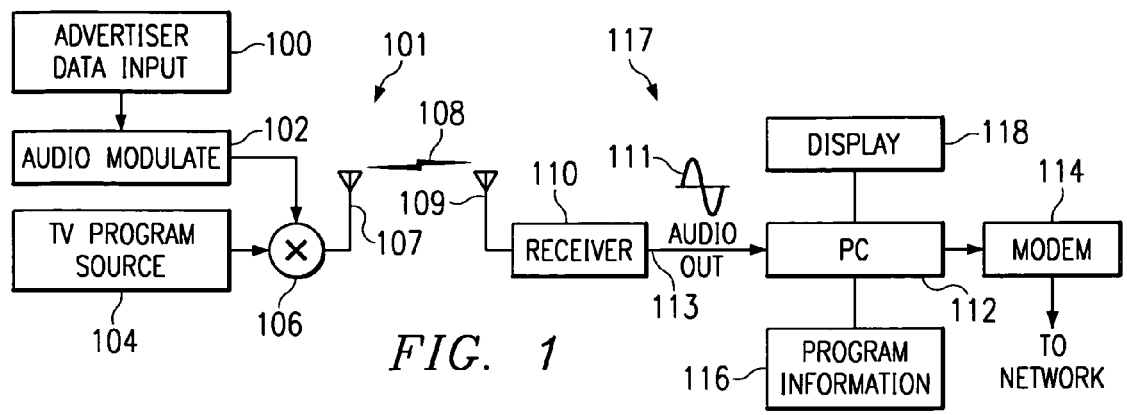
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network and then allow other routing information to be returned to the PC 112 for control thereof to route the PC 112 to the appropriate location associated with that code.

Figure 2:
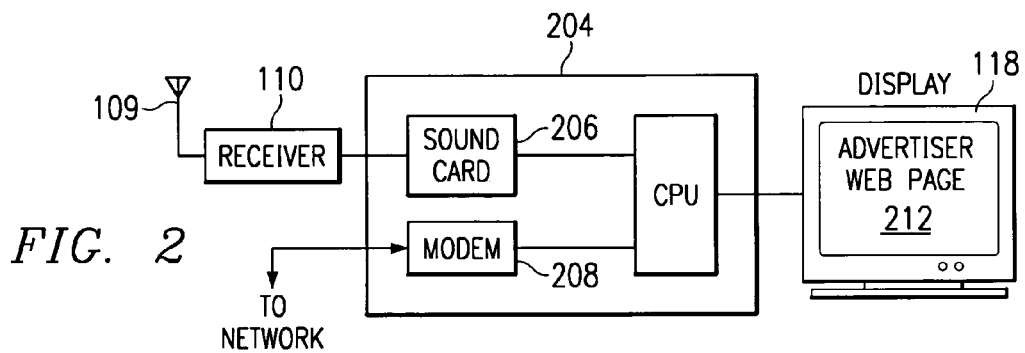
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL. This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
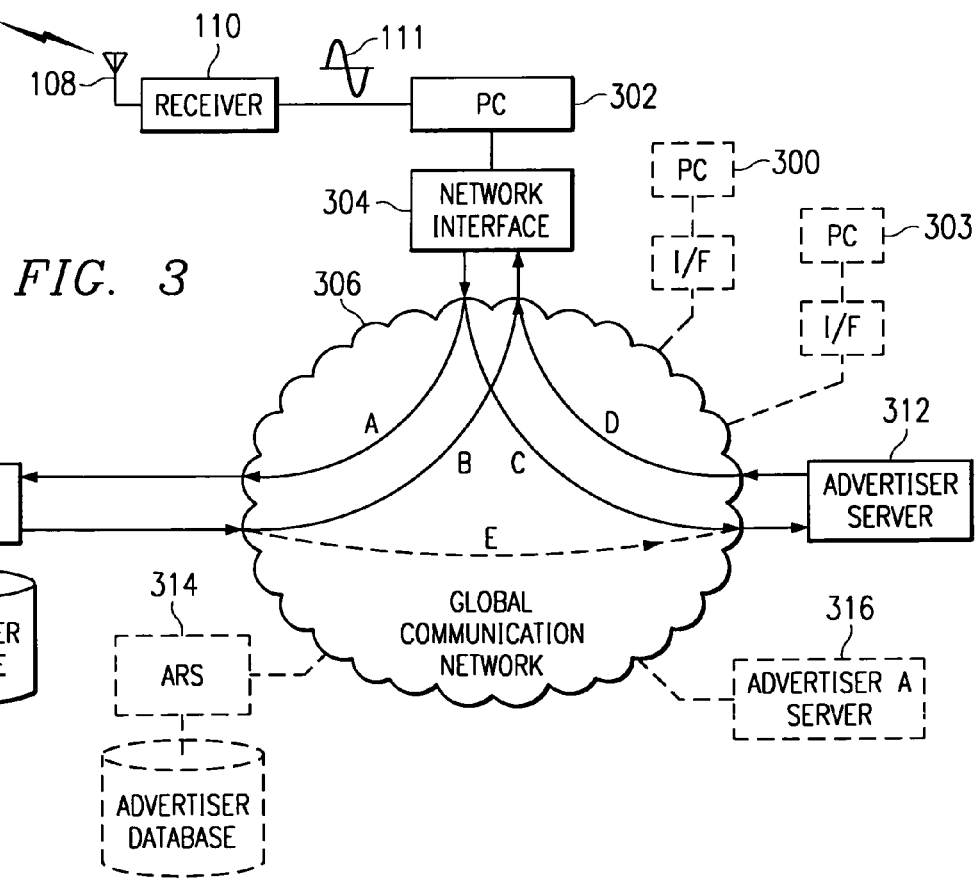
FIG. 3 illustrates system interactions over a global network.

Referring now to FIG. 3, there is illustrated a source PC 302, similar to PCs 204 and 112, connected to a global communication network (GCN) 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the GCN 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe, to this technology, manufacturer and product information is added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. It should be noted that although the disclosed invention discusses a global communication network, the system is also applicable to LANs, WANs, and peer-to-peer network configurations. Additionally, the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. However, it should be understood that any protocol can be used, with the primary requirement that a browser can forward the product information to the desired URL in response to keystrokes being input to a PC. Within the context of this disclosure, "message packet" shall refer to and comprise the destination URL, product information, and source address, even though more than a single packet must be transmitted to effect such a transmission.

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c; the message packet 404 for this transaction comprises the URL of the advertiser server 312, the request-for-product-information data, and the address of the source PC 302.

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a look-up table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
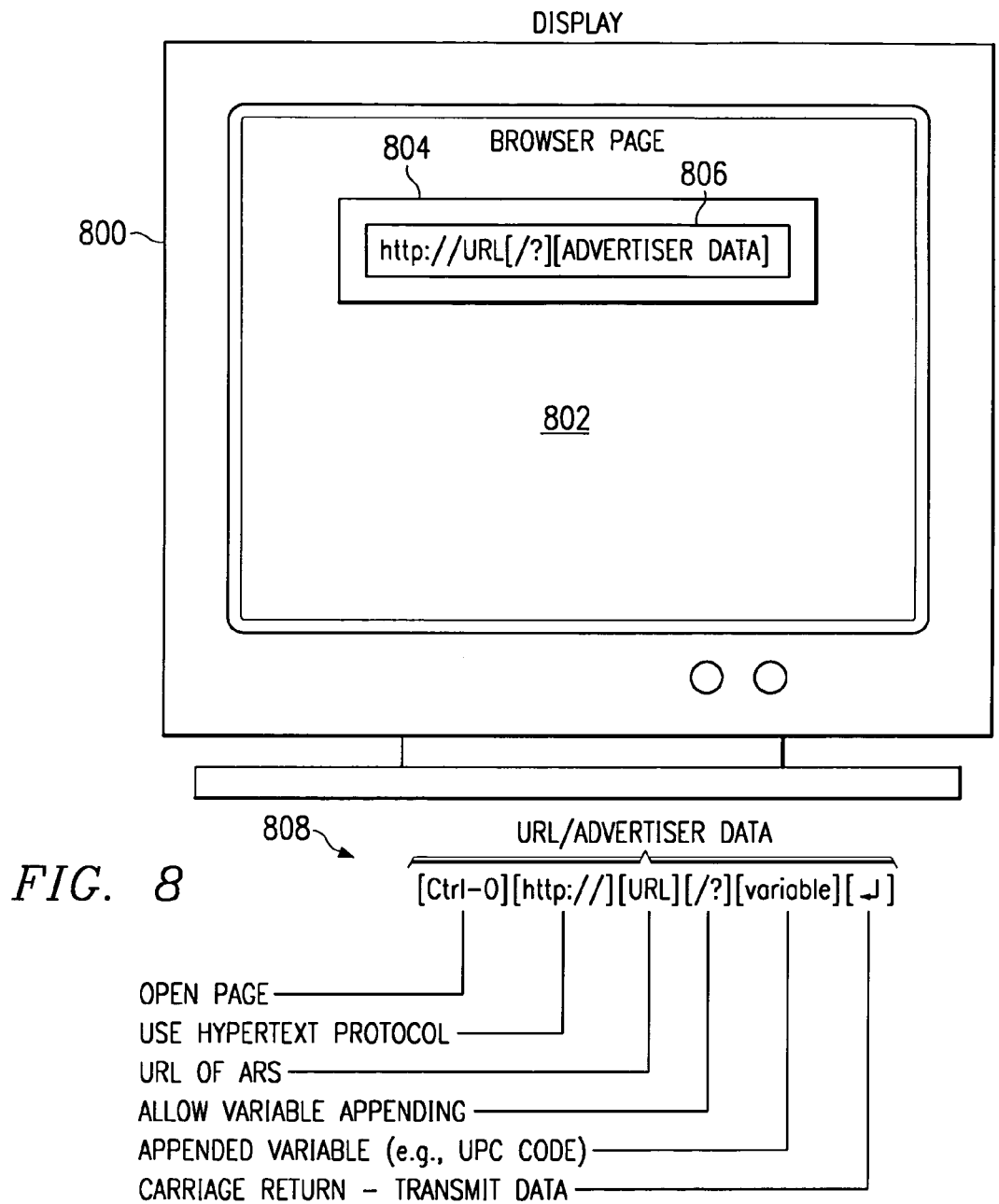
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
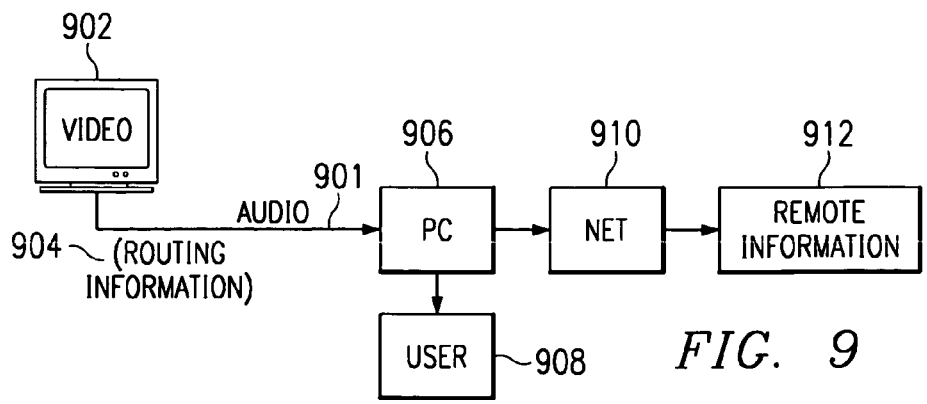
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the information stored in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the look-up procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated there with it is associated. The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
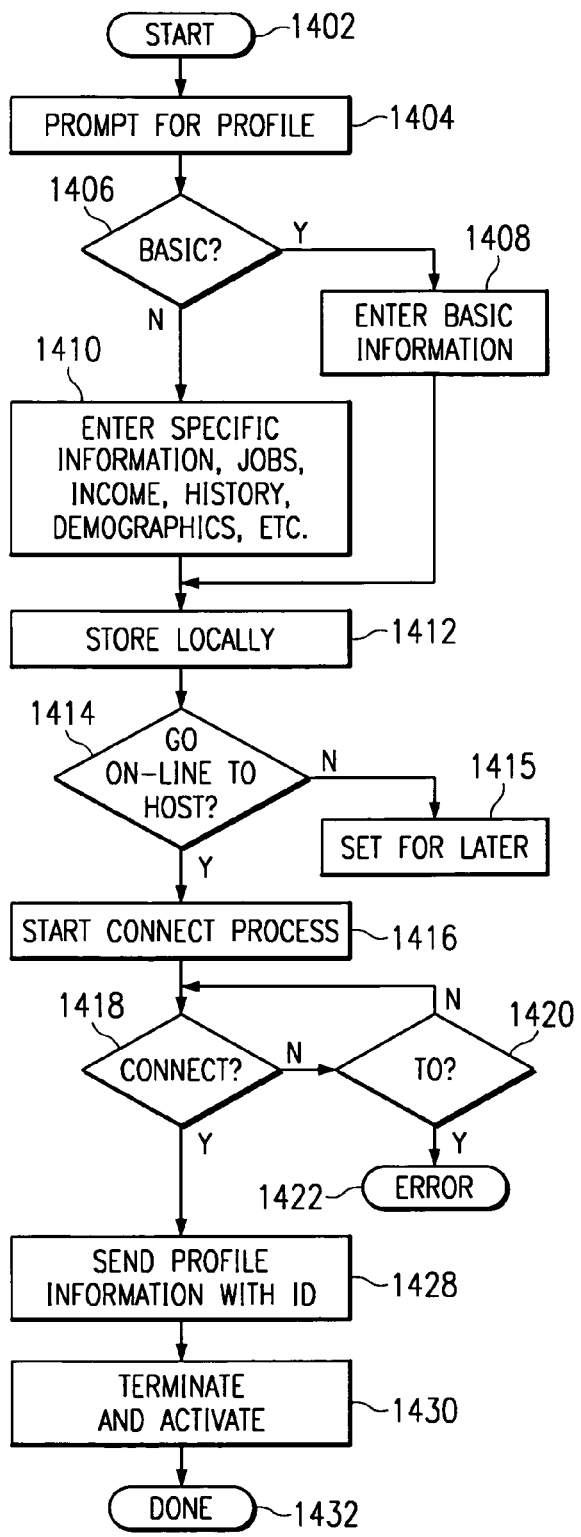
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to decision block 1420 which will timeout an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
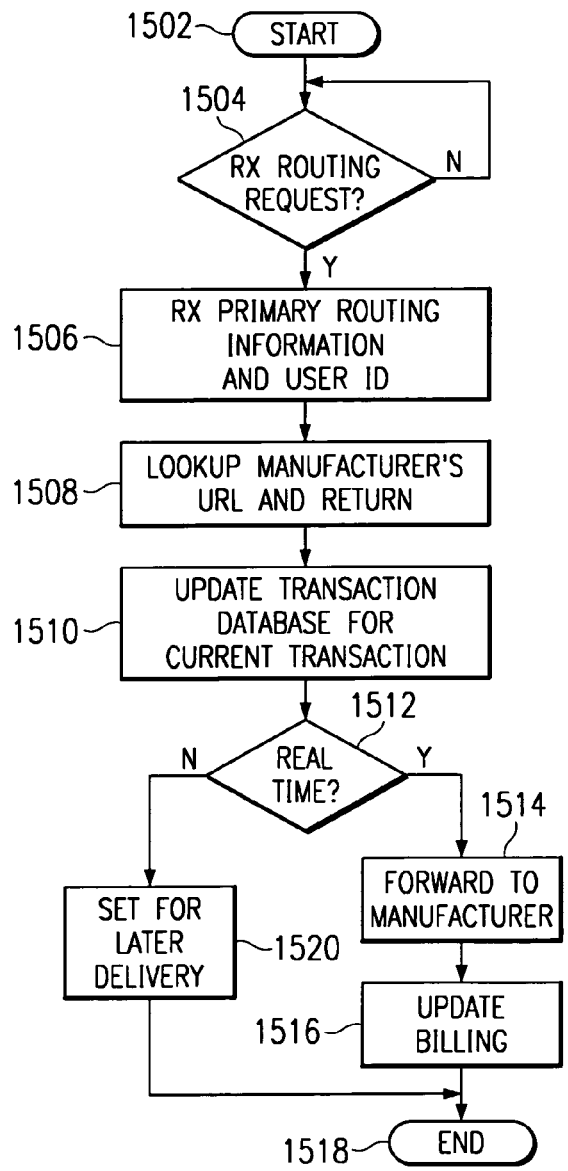
FIG. 15 illustrates a flowchart for processing the profile information when information is routed to a user.

Referring now to FIG. 15, there is illustrated a flowchart depicting the operation of the host when receiving a transaction. The program is initiated at a start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating that PC 112 in order to allow that PC 112 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either the one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user's PC 302 which will cause the user's PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user's PC 302 and a profile of the user themselves. Therefore, an advertiser can actually gain realtime information as to the number of individuals that are watching their particular advertisement and also information as to the background of those individuals, demographic information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with demographic information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Figure 16:
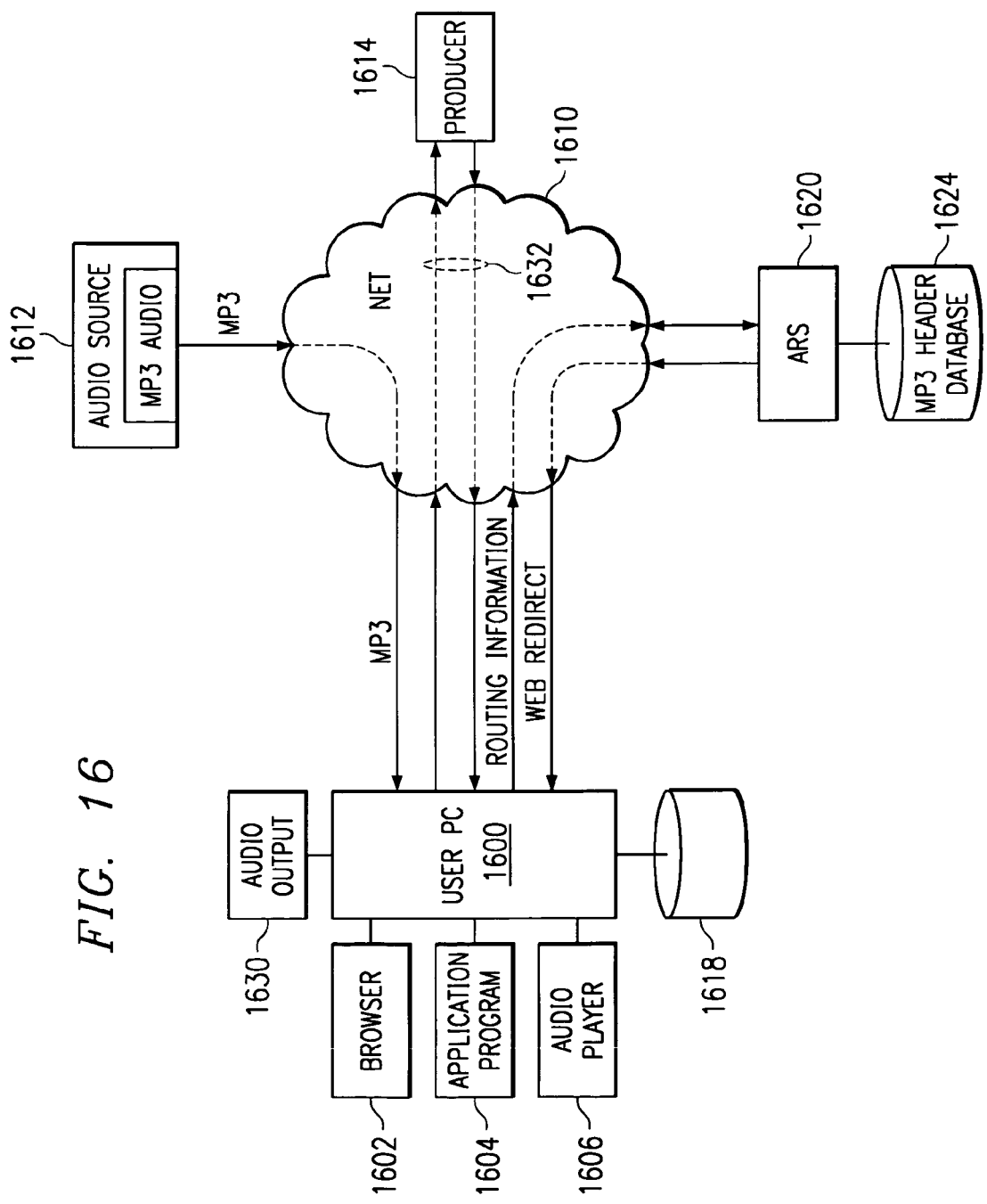
FIG. 16 illustrates a block diagram of an alternate embodiment of the disclosure.

Referring now to FIG. 16, there is illustrated a flowchart depicting an alternate embodiment of the disclosure. As described hereinabove, the transmission of encoded information is sensed by a user's computer which, when sensed and decoded, indicates to the computer that the computer is to launch the browser and then forward this information to an intermediate point for effecting a connection between an advertiser or producer and the user's PC.

Referring further to FIG. 16, there is illustrated a user PC 1600 which has associated therewith browser software 1602 and an application program 1604. The user PC 1600 is operable to run the application program 1604 in the background or the foreground. This application program 1604, as described hereinabove, is an application program that can detect certain inputs to the user PC 1600, as will be described in more detail hereinbelow. In addition to the application program 1604 running on the user PC 1600 and the browser program 1602 being capable of being run on the user PC 1600, there is also provided an audio player program 1606. This audio player program 1606 is a conventionally available program that allows the user PC 1600 to play audio. This audio is typically received in the form of a compressed audio format-an MP3 format. This compressed format is basically a compressed form of the conventional MPEG format. Again, this is a conventional format.

The user PC 1600 is interfaced to a global communication network 1610. As described hereinabove, the global communication network 1610 is a conventional network typically referred to by the name "Internet" involving a plurality of interconnecting nodes and routers. This allows the user PC 1600, through known addressing schemes, to interconnect to a remote location and forward information thereto and receive information therefrom, typically utilizing a TCP/IP protocol. In conventional operation utilizing the network 1610, the user PC 1600 is operable to interface with an audio source node 1612 to receive MP3 audio therefrom over the network 1604. This can be in the form of a popular song or the like such that is transferred thereto. This audio source node 1612 could be associated with an acquaintance of the user or even a commercial establishment. However, the primary information transmitted from the audio source 1612 to the user PC 1600 is an MP3 encoded audio program. This MP3 audio program, as will be described hereinbelow, is modified by the originating source of the audio to contain therein in an encoded format some routing information which is sensed by the application program 1604 when the audio player program 1606 actually plays the audio. Of course, once the audio is received in the MP3 format, it must first be decoded and then output as an audio signal, this requiring both the decoding step and an analog-to-digital data conversion operation, this being conventional. This is then output on an audio output device 1613.

The audio source 1612 must receive the audio program from some originating source. This may typically be from some other location which generated the audio source and which has transmitted it to an end user. The end user may receive the source, copy the source and transmit it to multiple individuals. This MP3 audio program could be transmitted to many individuals in a chain. As will be described hereinbelow, it is the user PC 1600 having the application program 1604 running in the background that will provide an interconnection to a producer node 1614. It is noted that the application program 1604 will typically be integrated with the audio player program 1606, although this need not be the case.

In operation, after an audio program with an MP3 format encoded with the routing information therein is received by the user PC 1600 and stored locally thereat on a hard disk 1618 and then played utilizing the audio player program 1606, or alternatively, received and immediately played with the audio player program 1606, the application program 1604 will sense routing information in the program, which was embedded therein by the originator of the program. This is typically not readily apparent to the user when listening to the audio program, although it is, in the preferred disclosure, audible. When the audio program is played, the application program 1604 senses the information in the embedded product information, utilizes this information to launch the web browser and the browser program 1602 and contact an ARS location 1620 over the network 1610. It is noted that the embedded information may be any information that can be recognized by the application program, and need not be actual information about the product. It could be some type of information correlating to an advertiser. As will be described hereinbelow, the embedded information has no relationship with anything except as defined in an MP3 header database at the ARS location 1620, as will be described hereinbelow.

The information transmitted to the ARS location 1602 by the application program 1604 comprises the embedded information from the audio program, user information stored at the user PC 1600 and the user's location on the network 1610. The ARS location 1620 utilizes this information to extract pre-stored and associated information from the MP3 header database 1624. As will be described hereinbelow, this information is pre-stored by the producer which allows the ARS 1620 to determine where the user PC 1600 should be directed over the network 1610. This pre-stored information, derived from a matching operation, is then transmitted back to the user PC 1600 and the browser software 1602 instructing the browser software 1602 to connect to a predefined location on the network 1610. This predefined location is the producer location 1614. In addition to instructing the browser 1602 what location to connect to, information forwarded back to the user PC 1600 by the ARS 1620 can also provide some user information or other information for delivery to the producer node 1614. The producer node 1614 will then make contact with the user PC 1600 and the browser software 1602 in order to provide a display to the user, i.e., it will effect a network connection thereto via a TCP/IP link. For example, while the user is listening to the audio program, advertising can be provided to the listener at the associated user PC 1600. This will allow the producer 1614 not only to derive information about who is listening to their software, legally or illegally, but also will allow the producer to possibly provide some information to the user, solicit additional sales from the user, etc.

Merely by playing the audio program, the audio player program 1608 will now interface with the application program 1604 to launch the browser 1602 in order to contact the producer. By storing information at the ARS location 1620, the producer need not store a great deal of the actual reading information in the MP3 audio track. The large portion of the routing information required by the user PC 1600 in order to connect to the producer 1614 is contained within the application program 1604. This allows a single program to access a single location, the ARS location 1620, in order to facilitate a connection with a producer 1614. If, for example, the producer 1614 were to change locations on the network 1610, i.e., change the universal resource locator (URL), this need only be updated in a single MP3 database, the MP3 header database 1624 at the ARS location 1620. Further, the small amount of information required to be stored in the MP3 audio header on the audio program is minimized due to the interaction with the application program 1604 and the fact that the actual routing information is stored at the ARS location 1620.

Figure 17:
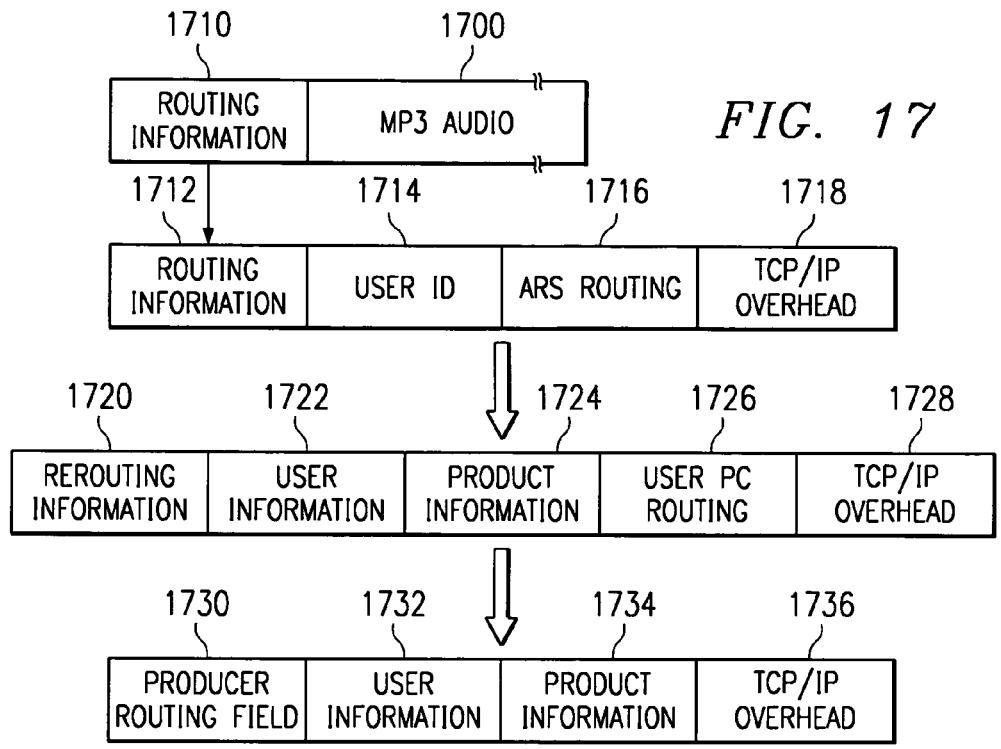
FIG. 17 illustrates a diagrammatic view of the headers that are assembled for the embodiment of FIG. 16.

Referring now to FIG. 17, there is illustrated a diagrammatic view of the information required to be forwarded to the ARS location 1620 and then to the producer location 1614. The original MP3 audio program is comprised of an actual compressed MP3 audio track 1700 which has associated therewith some type of audible routing or product information as a product header 1710. This is a tone which can be decoded due to the fact that it is comprised of multiple tones that are outputted in a predetermined sequence. (However, this need not be a tone. It could be any type of encoded information, in either the digital or audio domain.) This sequence, when decoded, indicates certain binary numbers. This tone can be embedded at any location within the MP3 audio track 1700, although it is illustrated in FIG. 17 as being at the beginning, i.e., a header. Depending upon the producer's desire, this program can be placed at any desirable location which would not aesthetically detract from the program.

When this audio program is played, the routing or product information in the product header 1710 is then sensed by the application program 1604. In addition to being sensed by the application program 1604, this tone or audio header contains information that uniquely identifies the audio program, albeit only at the ARS location 1620. Therefore, this information is assembled into a packet for being transmitted to the ARS location 1620. The application program 1604 has predisposed information contained therein as to the location of the ARS 1620 on the network 1610. Therefore, it need only assemble this information and route it to the ARS 1620. However, in addition to this information contained in header 1710, additional information such as information about the user at the user PC 1600 may be transmitted in the form of a user ID. This user ID is associated with information at the ARS location 1620 that is typically input to the ARS location 1620 from the user PC 1600 when the user PC 1600 is loaded with the audio player program 1606 or the application program 1604, the preferable situation being when the audio player program 1606 is integrated with the application program 1604. This user information at the ARS location 1620 can contain an entire user profile of the user. However, when created, this user profile is immediately transmitted to the ARS location 1620 and stored in a database associated therewith. All that is transmitted from the user PC 1600 thereafter is the user ID which is assigned to that user when installing either the application program 1604 or the combination of the application program and the audio player program 1606.

When assembling the packet for transmission to the ARS location 1620, the routing or product information in the product header 1710 is stored in the field 1712 as unique program information. A field 1714 is associated with the user ID and then an ARS routing field 1716 is provided in the packet. There is provided with this packet certain TCP/IP overhead in a field 1718. This is transmitted to the browser 1602, after launching thereof, as a URL string. This URL string typically is comprised of the domain name of the ARS location 1620 uniquely defining the ARS location on the network 1610, followed by informational characters. These information characters will comprise the information in the field 1712 and the field 1714. The field 1716 constitutes the ARS location 1620 routing code. Routing this information to the ARS 1620 is a conventional process.

Once the ARS location 1620 receives the routed packet comprised of the field 1712–1718, then this ARS location 1620 will create a packet for routing back to the user PC 1600. This packet will contain re-routing information in a field 1720 which instructs the browser 1602 where the location of the producer 1614 is on the net 1610, i.e., this is a hands-off operation. In addition to the re-routing information in field 1720, there is provided a field 1722 associated with the user information which was extracted from the MP3 header database 1624 and the product information in a field 1724 which was also extracted from the MP3 header database 1624. Also contained within the packet is a field 1726 instructing the network 1610 how to route this information back to the user PC 1600, in addition to a TCP/IP overhead field 1728. This is directed to the user PC 1600 which will then, through the conventional use of the browser 1602 and the HTML language, create an additional packet consisting of a producer routing field 1730, a user information field 1732 corresponding to the user information field 1722, a product information field 1734, corresponding to the product information field 1724 and a TCP/IP overhead field 1736. This will be utilized by the browser 1602 in order to determine how to route the information in fields 1732 and 1734 over to the producer 1614 for use thereby. At this point, a network connection has been made to the producer location 1614 and information relayed to the producer at node 1614 with information as contained in the MP3 header database 1624, all of this transparent to the actual user.

Figure 18:
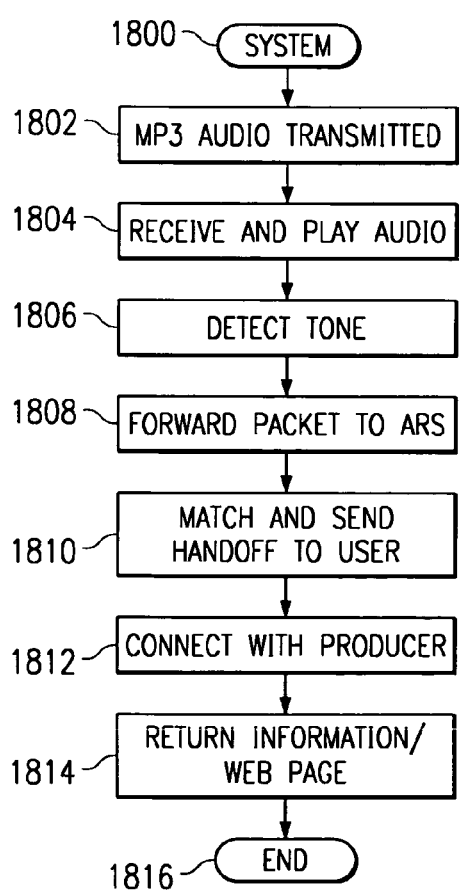
FIG. 18 illustrates a flowchart depicting the operation for transmitting MP3 audio.

Referring now to FIG. 18, there is illustrated a flowchart for the overall system operation. The program is initiated at a System block 1800 and then proceeds to a function block 1802 wherein the MP3 audio is transmitted to the user PC 1600. The user PC 1600 is then operable to store the information in the hard disk 1618, or other similar storage media, and then play will then be stored MP3 audio followed with the audio player program 1601. This is played for audio output on an audio output device 1613. The application program 1604 may be a separate program as described hereinabove or be integrated with the audio player program 1606. This receive and play operation is indicated by a function block 1804. It should be understood that the actual receipt of the information may trigger the audio player program 1606 to actually decompress and play the audio file. Although the application program 1604 may be embedded in the audio player 1606, the application program 1604 is operable to always be active in the background, such that the playing of the audio file will trigger the application program 1604 to launch the browser 1602. This is facilitated through a detect function, as indicated by a function block 1806, wherein playing of the audio file, i.e., decompression and output thereof through the audio output device 1630, results in output of the embedded product information associated with the audio program. Detection can be either in the audible domain or the digital domain, prior to conversion to the audio audible output signal 1630 from the digital domain. In any event, it is the detection of the signal that triggers the overall operation described hereinbelow.

When the MP3 signal is received by the user PC 1600, it is typically received along a path labeled MP3 in FIG. 16. This path is connected to the audio source 1612. After detection, this product information contained in the "tone" or other product header 1710, is then forwarded to the ARS location 1620, as indicated by function block 1808. This is funneled along a path labeled "Routing Info" to the ARS location 1620. A matching operation is then performed in the ARS location 1620 utilizing the MP3 header database 1624, as indicated by a function block 1810. This operation then performs a "hand off" operation to the user. This is indicated by a Redirect path from ARS location 1620 back to the user PC 1600, as indicated in FIG. 16. This, as described hereinabove, provides information as to the user profile, product information, all of which were stored in the MP3 header database 1624. This information is extracted due to the fact that the ARS location 1620 has received from the user PC 1600 both the user ID information and minimal product information through the code embedded within the product header 1710 in the audio track.

The program then flows to a function block 1812 wherein this information redirected from the ARS location 1620 back to the user PC 1600 is utilized to provide a connection with the producer location 1614 through a path 1632 within the network 1610. This is illustrated as a bidirectional path, since a TCP/IP protocol is utilized requiring packets to be transferred from the user PC 1610 to the producer's network location 1614 and then returned. As described hereinabove, this is typically in the form of a "web page" which provides information about the producer or manufacturer. Since the user not only has information as to the query, i.e., a request for web page information, but also includes user information, this allows the producer location 1614 to "customize" the information transferred back to the user in the form of both information corresponding to the actual product that triggered the connection and to some information about the user. For example, if the song was a popular song by singer John Doe, requested by user Jane Doe, then the producer could provide information regarding this song and similar types of songs associated with the type of music performed by John Doe to a user of the female gender. However, there could be demographics contained within the user profile and this could be utilized to further refine the information sent back to the user PC 1600. This return of information from the web page of the producer location 1614 is indicated by a function block 1814. Once this connection has been made, the program flows to an End block 1816.

Figure 19:
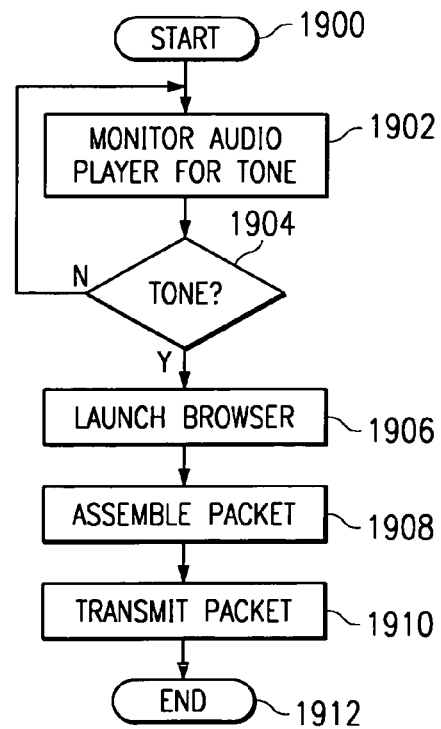
FIG. 19 illustrates a flowchart for controlling the user PC to launch the browser.

Referring now to FIG. 19, there is illustrated a flowchart depicting the operation at the user PC 1600. The program is initiated at a Start block 1900 and then proceeds to a function block 1902. At the function block 1902, the function of monitoring the audio player program 1606 for a tone is indicated. Since the audio player program 1606 is required in order to extract the information from the MP3 audio program file stored in either the hard disk 1618 or received directly from the audio source 1612, launching of the audio player program 1606 will also launch the application program 1604. The program will then flow to decision block 1904 to determine if the tone has been detected within the audio program file. It should be understood that each audio program file played by the audio player 1606 may not contain the tone or the embedded product information. If not, the program will flow along the "N" path back to the input of function block 1902. However, if the tone or embedded product information is detected, the program will flow along the "Y" path to a function block 1906 wherein the browser will be launched. The program will then flow to a function block 1908 to assemble a packet indicated in FIG. 17 for transfer to the ARS location 1620 and then to a function block 1910 to transmit the packet back to the location ARS 1620. This transmission is facilitated by the fact that the application program 1604 is aware of the address or URL of the ARS 1620 on the network 1610. The program then flows to an End block 1912. Once this operation has been initiated, the information transferred to the ARS location 1620 and that information processed at the ARS location 1620, then the application program 1604 is not required for further processing. This merely then requires interface between the ARS 1620 and the browser program 1602 using, typically, an HTML program language.

Figure 20:
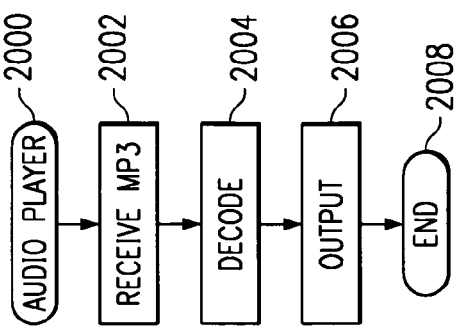
FIG. 20 illustrates a flowchart depicting the operation of operating the audio player software.

Referring now to FIG. 20, there is illustrated a program depicting the operation of the audio player program 1606. This is initiated at a block 2000 and then proceeds to a function block 2002 to receive the MP3 file, either directly from the network 1610 in the audio source 1612 or from the hard disk 1618. The program then flows to a function block 2004 to decode this MP3 file, i.e., decompress and play the program in an audio format, and then to a function block 2006 to output the audio on the audio output device 1630. The program then proceeds to an End block 2008. As described hereinabove, this audio output operation requires a data conversion operation, with the application program 1604 operable to detect the tone or embedded product information in either the digital version of the file after decompression thereof or in the audio version on the other side of the analog-to-digital conversion operation.

In summary, there has been provided a system to allow an audio file that is transmitted over a global communication network to have embedded therein product code information that is associated with a routing operation to a predefined location. When this audio file is received at a user's PC and decoded and output, a detection program detects the presence of embedded information. This embedded information is then utilized by a resident application program in the user's PC to launch a browser and transfer this embedded information to a remote intermediate location. This remote intermediate location has associated therewith a database, which database is operable to match the database information with the product and also with routing information for that embedded information. This routing information is predisposed in the database and may be associated with some advertiser that would like to reach users of the audio file or with the producer of the actual audio file. Once the remote intermediate location has determined this information, it returns the information back to the user's PC and the browser running thereon such that the browser can then contact the routed-to location indicated in the database directly. Additionally, there can be certain information provided by the remote intermediate location in addition to the routing information to the end location for use thereby. Alternatively, the intermediate remote location could directly contact the desired routed-to location to allow that location to directly contact the user PC without having to go back to the browser of the user PC, although this is a more complex routing operation.

Although the preferred embodiment has been described in detail, it should be understood that various changes, substitutions and alterations can be made therein without departing from the spirit and scope of the invention as defined by the appended claims.

What is claimed is:

1. A method for effecting a connection between a user node and a destination node on the network with an audio program, comprising the steps of:
   playing at the user node the audio program having embedded therein a unique header code, the user node further includes user ID information that uniquely identifies the user node;
   detecting the unique header code at the user node during the playing of the audio program at the user node;
   in response to detecting output of the unique header code during playing of the audio program at the user node, without user intervention assembling the unique header code into a message packet and transmitting information regarding the unique header code over the first network to an intermediate node on the first network, and also transmitting the user ID information to the intermediate node;
   matching the received information regarding the unique header code with routing information stored in a database at the intermediate node and matching the received user ID information of the user node with the stored profile information in the database associated with the received user ID information, which routing information defines the location on the first network of a plurality of destination nodes, the database having stored therein a correspondence between unique header codes and select ones of the destination nodes and wherein the database includes a stored profile which is associated therein with the user ID information of the user node; and
   if there is a match between the received unique header code and a unique header code stored in the database, causing the destination node and the user node to be connected over the first network with the corresponding routing information, such that the destination node can transmit information to the user node, the step of causing the destination node and the user node to be connected if there is a match comprises the steps of:
   transmitting back to the user node the routing information determined to be stored in the database and corresponding to the received unique header code as associated with the information regarding the unique header code at the intermediate node and appended thereto the stored profile information,
   the user node utilizing the received routing information to effect a connection to the destination node from the user node and transmit thereto the received stored profile information, and
   the destination node, in response to being connected to the user node via the routing information, operable to transfer information to the user node.

2. The method of claim 1, wherein the unique header code is an audible code.

3. The method of claim 1, wherein the unique header code comprises a unique tone.

4. The method of claim 1, wherein the first network comprises a global communication network.

5. The method of claim 1, wherein the transmitted information regarding the unique code comprises substantially all of the unique code.

6. A system for effecting a connection between a user node on a network and a destination node with an audio program, comprising:
   a unique header code embedded within said audio program, said audio program playing at said user node, wherein said user node further includes user ID information which uniquely identifies said user node;
   a detector for detecting said unique header code at said user node during play of said audio program at said user node when received;
   an intermediate node disposed on said first network for receiving information regarding said unique header code, said information regarding said unique header code and said user ID information being assembled into a message packet and transmitted without user intervention over said network to said intermediate node in response to said detector detecting output of said unique header code during play of said audio program at said user node;
   routing information stored in a database at said intermediate node, in addition to a stored profile which is associated therein with said user ID information at said user node, such that said routing information is matched with said received information regarding said unique header code, which said routing information defines a location on said network having a plurality of destination nodes, said database having stored therein a correspondence between said unique header codes and select ones of said destination nodes, and the received said user ID information of said user node is matched with stored profile information associated with said received user ID information; and
   if there is a match between said received unique header code and a said unique header code stored in said database, said routing information determined to be stored in said database and corresponding to said received unique header code as associated with said information regarding said unique header code stored at said intermediate node with said matching profile information is transmitted back to said user node, said user node utilizing said received routing information to effect a connection to said destination node from said user node and send thereto said matching stored profile information, said destination node in response to being connected to said user node via said routing information is operable.

7. The system of claim 6, wherein said unique header code is an audible code.

8. The system of claim 6, wherein said unique header code comprises a unique tone.

9. The system of claim 6, wherein said network comprises a global communication network.

10. The system of claim 6, wherein said transmitted information regarding said unique code comprises substantially all of said unique code.

* * * * *